United States Patent Office 3,337,209
Patented Aug. 22, 1967

3,337,209
DEVICE FOR BALANCING FORCES OF INERTIA
OF THE RECIPROCALLY MOVING MASSES
Sergei Nickolaevich Kozhevnikov, Kiev, and Bronislav
Mecheslavovich Klimkovsky, Arkady Semenovich Tkachenko, and Anatoly Vladimirovich Prazdnikov, Dnepropetrovsk, U.S.S.R., assignors to Institute Chernoi Metallurgii, Dnepropetrovsk, U.S.S.R.
Filed Oct. 23, 1964, Ser. No. 406,058
8 Claims. (Cl. 267—75)

The present invention relates to a device for balancing the forces of inertia of a reciprocally driven mass, such as for example the stand of a cold-rolling pipe mill.

There is known a pneumatic device for balancing the forces of inertia of a stand mass, said device comprising a pneumatic cylinder with a piston, driven by means of a gear couple, the rack of which is attached to the stand.

When a gear drive performs a reciprocal motion, there are produced impact loads that detrimentally affect the life of the parts of the balancing device.

Another disadvantage of the known device is that it prevents the transmission of only 50 percent of the inertial forces of the stand mass to the parts of a main drive and is therefore inefficient when the mill operates according to a transient mode. Therefore, the use of such a device does not permit increase of the rolling speed. Such a device is bulky and costly.

An object of the present invention is to eliminate said disadvantages.

A principal object of the invention is the provision of a balancing device, having both smaller weight and dimensions, when compared to the known devices, which permits fully to eliminate the action of forces of inertia of the stand mass on the parts of the main drive when working both under steady and transient operation conditions of a cold-rolling pipe mill, and featuring also increased wearability and life.

These objects are achieved by using a device for balancing the forces of inertia of a reciprocally driven mass of a stand of cold-rolling pipe mill, comprising at least one pneumatic cylinder, communicating with a source of compressed air. According to the present invention, in the proposed device the rod of a piston is directly connected with the mill stand.

The device is also provided with a means for maintaining a specified pressure in the cylinder space, for example, by means of a reducing valve, mounted in pneumatic line between the source of compressed air and the cylinder. The use of the reducing valve allows to stabilize the stand operation, that is, to increase the smoothness of its movement.

It is expedient to hinge-mount the cylinder, for example, on pivot journals in order to make it turn in the vertical plane.

Figure 1:
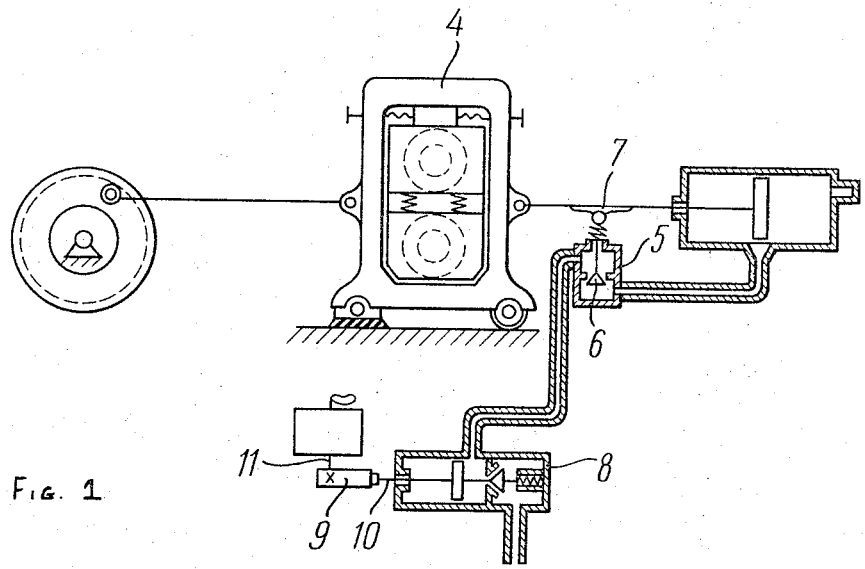
Figure 2:
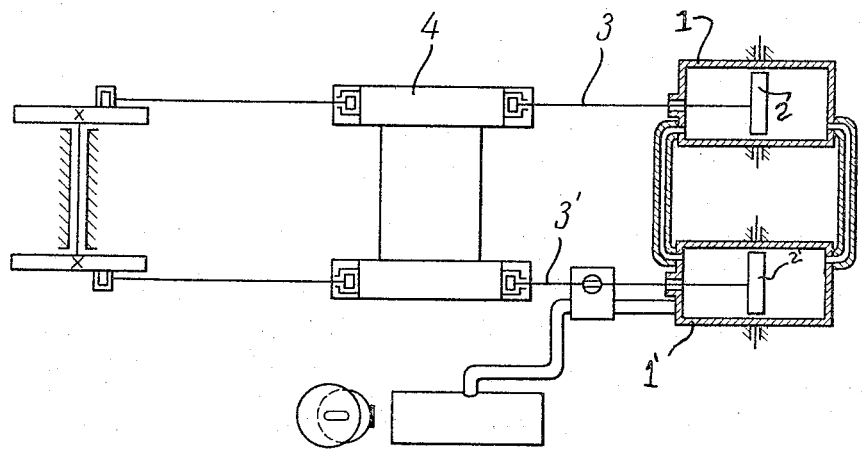

A more complete description of one embodiment of the invention is given hereunder with reference to the accompanying drawings, in which:

FIG. 1 is a side elevational view of a device for balancing the forces of the inertia; and FIG. 2 is a top view of the device.

The proposed balancing device comprises two cylinders 1 and 1', hinge-jointed on a base. By means of rods 3 and 3' the pistons 2 and 2' of these cylinders are connected with a stand 4, and are movable parallel to the axis of rolling when the stand moves. To prevent possible distortions of the stand corresponding spaces within the cylinders are in communication with each other.

The air, lost due to leakage from the cylinders, is replenished by means of a valve arrangement 5, connecting the cylinders 1 and 1' with the main at the instant when the pistons of the cylinders are passing through median positions of their strokes. The main is connected with the cylinders by the automatic opening of a valve 6 by a copying device 7.

Since for each value of the number of double strokes of the stand per minute, i.e. to the number of drive revolutions, there correspond definite values of forces of inertia of the stand mass, and for balancing which there is required a certain value of air pressure in the cylinders, a controllable pneumatic reducer 8 is employed in the device. The controllable pneumatic reducer 8 is connected by cam 9 and pusher 10 with shaft 11 of a controller for operating the motor of the main drive.

The stand 4 and pistons 2 and 2' are adjusted so that at an intermediate position of the stand, the pistons also occupy an intermediate position in relation to the cylinders, and at this moment the air is supplied into said cylinders under a certain pressure.

When the stand moves from its intermediate position, the air in the spaces of certain cylinders is compressed, and in the other ones it is expanded; the resistance of the air thus set up is transmitted by means of rods to the stand. Thus, the stand, on the one hand will be subjected to the action of forces of inertia of the stand mass, moving at a variable rate, and, on the other hand be subjected to the action of the resistance of the compressed air in the cylinders, with said resistance force being equal to the force of inertia, but applied in the opposite direction. Thereby the action of forces of inertia on the elements of the drive for the stand and rolls is eliminated.

As the forces of inertia $F_1 = ma$, applied to the stand mass $m$, must be balanced by the force of resistance $F = pS$, set up as a result of the compression and expansion of the air in the cylinders 1 and 1' with the stand 4 moving, identical modes of the change in the acceleration $a$ and specific pressure $p$ are required in order to fully balance the forces of inertia when the speed of rotation of crank-shafts of the main drive varies. This is provided for with the controllable reducing valve 8.

With the shaft 11 of the controller turned into a specified position, the cam 9 is turned through a corresponding angle, thus, through pusher 10, the reducing valve is set to the corresponding pressure. A definite pressure in the cylinders corresponds to each position of the controller. On the other hand, each position of the controller corresponds to a specified number of revolutions of the stand drive. This enables setting of such initial pressures of air in the cylinders, which completely eliminate the transmission of forces of inertia of the stand mass to the parts of the stand drive and the rolls of the cold-rolling pipe mill both under steady and transient conditions of the mill operation.

What is claimed is:

1. A device for balancing the forces of inertia of a reciprocally driven mass comprising: a base, a source of compressed air, a pneumatic cylinder mounted on said base, a piston in said cylinder, a piston rod connected to said piston and directly connected with the mass, said piston having a central position in the cylinder when the reciprocally moving mass is in a middle position, and valve means for momentarily connecting the source of compressed air with the cylinder when the piston is in said central position, so that continued movement of the mass beyond its middle position is resisted by compression of the air in the cylinder.

2. A device as claimed in claim 1 wherein said valve means is coupled to said piston rod to be controlled thereby in dependence of the position of the piston rod.

3. A device as claimed in claim 1 comprising means pivotally supporting the cylinder for movement in a vertical plane.

4. A device as claimed in claim 1 comprising a second cylinder, piston and rod adjacent the first said cylinder, piston and rod, said cylinders being in communication with one another on opposite sides of respective pistons.

5. A device as claimed in claim 1 further comprising a reducing valve between said source and said valve means for establishing a prescribed value of pressure of the air supplied to said cylinder.

6. A device for balancing the forces of inertia of a reciprocally driven mass, said device comprising a base, a source of compressed air, a pneumatic cylinder mounted on said base, a piston in said cylinder, a piston rod having two ends, one end being connected to the piston and the other end being connected to the mass, valve means connecting the source of compressed air with the cylinder, to introduce air into the cylinder such that the air is compressed within the cylinder when the mass displaces the piston and the thusly compressed air resists continued movement of the mass, and actuating means controlling said valve means, said actuating means being coupled to said piston rod and controlling said valve means in dependence upon the position of said piston rod.

7. A device as claimed in claim 6 comprising means for maintaining a prescribed value of pressure of the compressed air supplied to the cylinder.

8. A device as claimed in claim 7, wherein the means for maintaining a prescribed value of pressure is a reducing valve.

References Cited

UNITED STATES PATENTS

| 2,054,370 | 9/1936 | Gross | 205—3 |
| 2,917,305 | 12/1959 | Talbot | 267—75 |

FOREIGN PATENTS

| 480,119 | 1/1952 | Canada. |

FRANCIS S. HUSAH, *Primary Examiner.*